United States Patent [19]
Nojiri et al.

[11] 4,113,990
[45] Sep. 12, 1978

[54] SIGNAL SENDING CONTROL SYSTEM

[75] Inventors: Shoji Nojiri; Hisao Kanzaki, both of Montebello, Calif.; Nobuyuki Yasoshima, Zama, Japan; Yasuo Satake; Kenichi Ogawa, both of Kawasaki, Japan

[73] Assignee: Fujitsu Limited, Kawasaki, Japan

[21] Appl. No.: 788,971

[22] Filed: Apr. 19, 1977

[30] Foreign Application Priority Data

Apr. 24, 1976 [JP] Japan .................................. 51-46899

[51] Int. Cl.² .......................................... H04M 3/04
[52] U.S. Cl. ............................ 179/84 R; 179/18 HB
[58] Field of Search .............. 179/84 R, 18 HB, 84 A, 179/18 F, 18 FA, 17 E

[56] References Cited
U.S. PATENT DOCUMENTS

| 3,283,082 | 11/1966 | Vigliante | 179/18 HB |
|---|---|---|---|
| 3,443,033 | 5/1969 | Louis | 179/84 R |
| 3,492,436 | 1/1970 | Feiner | 179/18 HB |
| 3,492,437 | 1/1970 | Feiner | 179/18 HB |
| 3,767,857 | 10/1973 | Colas | 179/18 HB |

Primary Examiner—Kathleen H. Claffy
Assistant Examiner—Joseph A. Popek
Attorney, Agent, or Firm—Staas & Halsey

[57] ABSTRACT

A signal sending control system for use in a telephone system includes a ringing signal sending circuit having a signal source for generating a continuous ringing signal, interrupting means for controlling the sending of the ringing signal over each subscriber line, one switch for each subscriber line for selectively and switchably connecting the respective subscriber line to a speech network of the system and to the ringing signal sending circuit, a common controller for providing control information as to the duration of the ringing signal, and a control circuit for individually controlling the switching circuit of each subscriber line in accordance with the control information and for controlling the transmission duration of the ringing signal.

17 Claims, 4 Drawing Figures

SIGNAL SENDING CONTROL SYSTEM

BACKGROUND OF THE INVENTION

1. Field of the Invention

This invention relates to a signal sending control system, and more particularly to a signal sending control system for use in a telephone system which employs telephones having a bell for calling and an exchange having a speech network composed of electronic switches.

2. Description of the Prior Art

In the telephone system employing telephones having a bell for calling and an exchange having a speech network composed of electronic switches, which system is now in wide use, since a signal for calling the telephone has an energy level higher than the limit of energy level which can be handled by the electronic switches forming the speech network, it is absolutely necessary to prevent a ringing signal current from flowing in the electronic switches, as well as to prevent noises generated by the connection or disconnection of the ringing signal current from flowing in the electronic switches.

Usually, the ringing signal is intermittently sent to the telephone in such a manner as to be connected to the telephone for 2 seconds at equal intervals of 4 seconds. In the prior art, a ringing signal of, for instance, 20 Hz, is interrupted by a common device so as to be connected for 2 seconds and cut off for 4 seconds, and sent to each telephone. Further, in order to prevent noises, generated by the connection of a ringing signal sending circuit to a subscriber's line or by the disconnection of the former from the latter, from flowing in the speech network, the ringing signal sending circuit is connected to the called subscriber's line for ringing, but disconnected therefrom while no ringing signal is sent out from the ringing signal sending circuit.

With the known ringing signal sending system, the phase of interruption of the ringing signal is limited to only one, as is evident from the above. Accordingly, there are some occasions when no ringing signal is sent to a called telephone immediately after the completion of the terminating connection, resulting in a delay in calling. Further, the prior art system has a disadvantage in that it is incapable of offering a service whereby the kind of a call is indicated by changing the state of interruption of the ringing signal according to, for example, a call from an extension of the private branch exchange or an incoming call from the central office line.

In this kind of exchange, that is, a stored program controlled electronic exchange, control information for controlling the sending and stopping of the ringing signal and the ring back tone is supplied to the line circuits or trunks from the common controller through a signal distributor. In this case, flip-flops are provided to have one to one correspondence to controlled devices of the line circuits or trunks, for example, relays, and the abovesaid control is achieved through these flip-flops. In the prior art, the flip-flop group is provided in a unit larger than that of additional provision of the line circuits or trunks, or basically corresponding to the capacity of the exchange used. The control information transferred in parallel from the common controller is once stored in a buffer register of the signal distributor, and then transferred in parallel to the flip-flop group to bring the flip-flop of a designated row into a state corresponding to the control information in the signal distributor. And, in accordance with the state of the flip-flop, the relay of the line circuit or trunk corresponding to the flip-flop is controlled.

With such prior art systems, since the control information is transferred in parallel from the flip-flops of the signal distributor to the relays to be controlled, a large number of insulated conductors are required for a transmission cable, resulting in an increased cable diameter and hence high manufacturing cost.

Moreover, in the prior art, the flip-flop group is composed of flip-flops whose number is determined in accordance with the maximum number of subscribers or trunks planned to be accommodated in the exchange. Accordingly, if such an exchange is employed in the case of the number of subscribers or trunks being smaller than that of the flip-flops, a certain number of flip-flops are wasted, and in the opposite case, it requires much work to add more flip-flops.

SUMMARY OF THE INVENTION

One object of this invention is to provide a signal sending control system for use in a telephone system employing telephones having a bell for calling and a speech network composed of electronic switches and in particular, in a private branch exchange system of such a type, which signal sending control system ensures the achievement of calling immediately after the completion of a terminating connection and enables the changing of the state of interruption of a ringing signal depending upon kind of the call involved.

Another object of this invention is to provide a signal sending control system for the abovesaid kind of telephone system in which a ring back tone can easily be sent back to the calling telephone in synchronism with a ringing signal.

Another object of this invention is to provide a signal sending control system for the abovesaid kind of telephone system which is adapted to achieve serial transmission of control information from a signal distributor so as to thereby decrease the diameter of the transmission cable and hence reduce the manufacturing cost.

Still another object of this invention is to provide a signal sending control system for the abovesaid kind of telephone system in which flip-flops for controlling line circuits or trunks are not provided basic correspondence to the capacity of the exchange to form a flip-flop group but are distributed for each group of the line circuits or trunks, thereby to enable efficient use of the flip-flops and facilitate additional provision of flip-flops.

Other objects, features and advantages of the present invention will hereinafter become more fully apparent from the following description in conjunction with the accompanying drawings which illustrate preferred embodiments of the invention.

DESCRIPTION OF THE PREFERRED EMBODIMENTS

Figure 1:
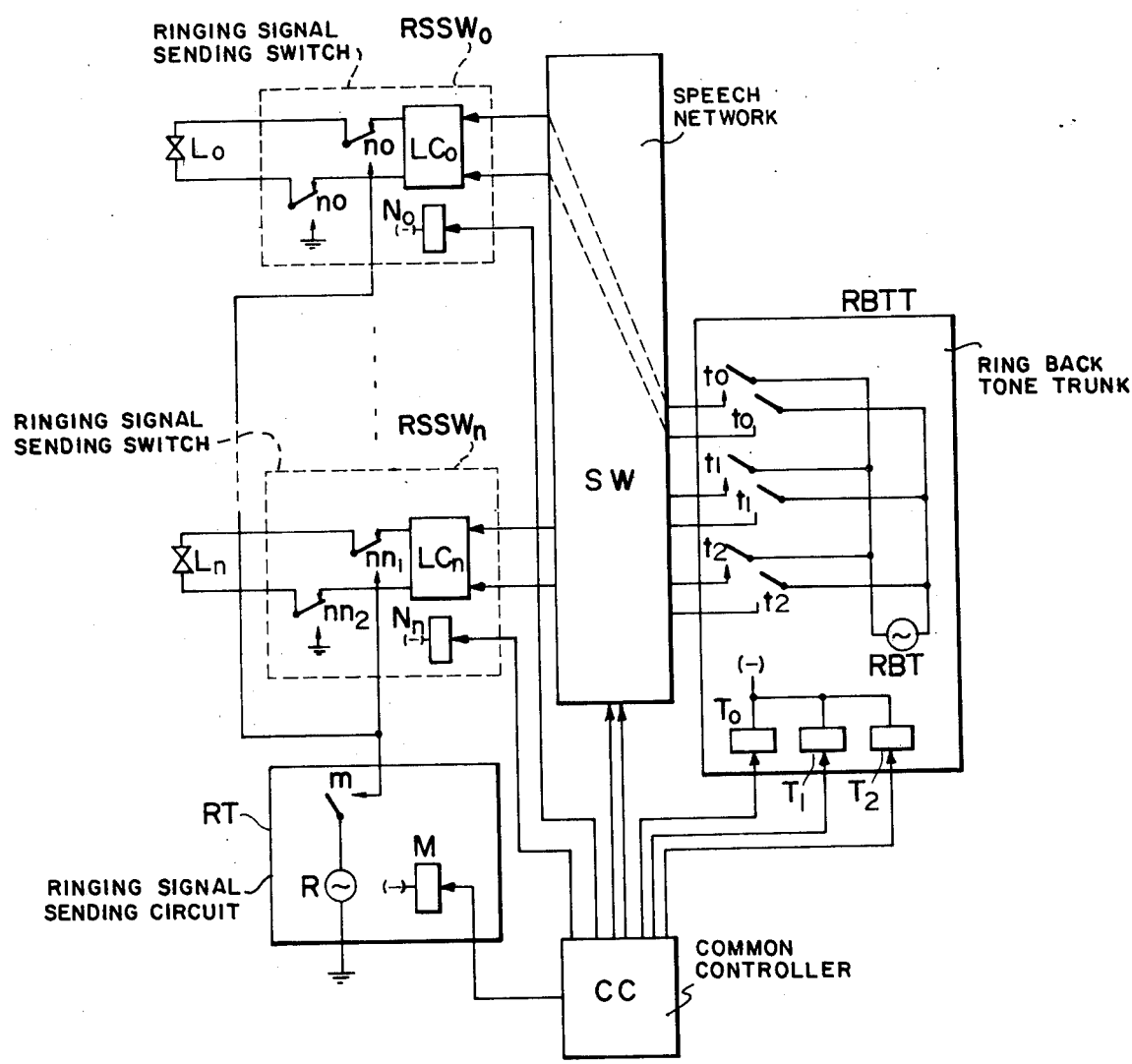
FIG. 1 is a connection diagram explanatory of the principle of this invention.

FIG. 1 is a connection diagram explanatory of the principle of this invention. In FIG. 1, an exchange comprises a speech network SW of, for example, the time-division system, which is composed of electronic switches, and a common controller CC which controls the speech network SW. The speech network SW is required to permit the passage therethrough of an electrical energy of a low level such as a voice current, a ring back tone or the like, but to inhibit the passage therethrough of a ringing current having an electrical energy of a level high enough to ring a bell of a telephone. Further, it is necessary to prevent noises generated by the interruption of the ringing signal from flowing in the speech network SW.

The exchange has connected thereto many telephones $L_0$ to $L_n$, but is shown to have connected thereto two of them, as indicated by $L_0$ and $L_n$.

Let it be assumed that the telephone $L_0$ originates a call terminating at the other telephone $L_n$. In this case, the telephone $L_0$ is connected to $L_n$ through the speech network SW under the control of the common controller CC. In recognition of the terminating or called telephone $L_n$ being idle, the originating or calling telephone $L_0$ is not connected to the called one $L_n$ but is connected to one input end of a ring back tone trunk RBTT through the speech network SW, and a ringing signal is sent to the called telephone $L_n$ under the control of the common controller CC.

At first, the common controller CC applies a signal (ground) to a relay $N_n$, which is part of a ringing signal switching means $RSSW_n$ of the called telephone $L_n$, to actuate the relay $N_n$ to change over its contact $nn_1$ and $nn_2$, thus connecting one side of the called telephone to a ringing signal sending circuit RT and the other side of the called telephone to ground. Then, the common controller CC applies a signal (ground) to ringing signal sending control means of the ringing signal sending circuit RT, that is, to a relay M, by which the relay M is actuated to close its contact $m$ to provide a closed circuit; the closed circuit comprises: the ground — a ringing source R for sending out a continuous signal — the contact $m$ — the contact $nn_1$ — the telephone $L_n$ — the contact $nn_2$ — the ground, thus applying a ringing signal to the telephone $L_n$.

After a predetermined time, for example, after a 2-second lapse, under the control of the common controller CC, the relay M is released to cut off the signal current, and then the relay $N_n$ is released. The telephone $L_n$ receives the ringing signal only when its relay $N_n$ and the relay M are both operated. Further, after a second predetermined time, for example, a 4-second lapse, the same operation as described above takes place. As a result of this, the bell is repeatedly rung for 2 seconds at equal intervals of 4 seconds.

In this case, when the ringing signal of high power level is connected or disconnected by the contact $m$, the relay $N_n$ always operates to change over the contacts $nn_1$ and $nn_2$ to disconnect and connect the ringing signal path and the speech network SW from each other, so that neither the ringing signal itself nor noises generated by the make and break of the contact $m$ flow in the speech network SW.

On the other hand, in synchronism with the application of the signal to the relay $N_n$ from the common controller CC, a signal is applied to a relay $T_0$ of the ring back tone trunk RBTT to actuate the relay $T_0$ to close its contacts $t_0$ (two). As a result of this, a ring back tone is applied from a ring back tone source RBT to the calling telephone $L_0$ through the contacts $t_0$ and the speech network SW. As described above, sending of the ringing signal and that of the ring back tone can be easily synchronized with each other.

Reference characters $LC_0$ to $LC_n$ indicate circuits which respectively supervise loops of subscriber's lines and supply speech currents to the telephones. If, now, the called telephone $L_n$ answers, the off-hook condition is detected by the circuit $LC_n$ which takes action to stop sending of the ringing signal. The calling telephone $L_0$ is then disconnected from the ring back tone trunk RBTT and a speech path to the called telephone $L_n$ is established through the speech network SW so as to enable talking.

Figure 2:
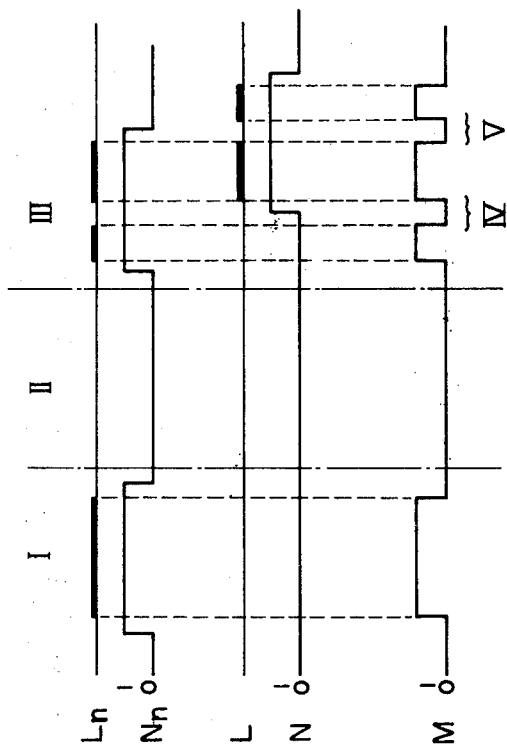
FIG. 2 is a time chart showing the time relationships between ringing signal sending and operation and release of relays related to the ringing signal sending operation in the system of this invention.

FIG. 2 is a time chart showing the time relationships between sending of the ringing signal and the operations of the relays M, $N_n$ and N. In FIG. 2, $L_n$ and L show the state of sending of the ringing signal, the thin lines indicating the ringing signal suspension periods and the thick lines the ringing signal sending periods. As regards the relays $N_n$, N and M, the level 0 indicates their release periods and the level 1 their operation periods.

The region I shows the case where a ringing signal is sent to only one of the telephones of the exchange, that is $L_n$. The relay $N_n$ of this telephone $L_n$ is operated prior to the operation of the relay M and released subsequent to the release of the latter.

The region II shows the case where no ringing signal is sent to any one of the telephones, and the relays M, N and $N_n$ are all inoperative.

The region III shows the case where ringing signals to, for example, two telephones, overlap each other in time. In the event that during sending of a ringing signal to the telephone $L_n$, a ringing signal is sent to the telephone L, the relays $N_n$ and M are operative during sending of the ringing signal to the telephone $L_n$, and the relay N is operative for sending the ringing signal to the telephone L, but it is necessary to release the relay M before the operation of the relay N.

In this case, as indicated by the period IV in FIG. 2, the relay M is released first, and then the relay N is operated and then the relay M is operated. Since the relays M and N are both operated, a ringing signal is sent to the telephone L. In this case, although the relay M is released, during which time the ringing signal R to the other telephone $L_n$ is interrupted, the period of interruption is so short that the interruption does not exert any influence upon ringing of the bell of the telephone $L_n$.

Also in the period V in which the ringing signal to the telephone $L_n$ terminates, the ringing signal to the telephone L is similarly interrupted but ringing of its bell is not affected.

In the above, timing signals for the operation and release of the relays $N_0$ to $N_n$ of the respective telephone circuits and the relay M of the ringing signal sending circuit RT are sent out under the control of the common controller CC.

Further, it is possible to let a called person previously know the kind of a call (a terminating call from an extension, an incoming call from a central office line, or the like) in the following manner:— In the common controller CC, the kind of the call is identified, by which the timing for controlling the relay N of the terminating subscriber's line is changed to alter the state of interruption of the ringing signal.

If the signal sending control system according to this invention is constructed as described above, upon completion of terminating a connection, a ringing signal can be sent to a called telephone without delay and, further, since interrupting of the tempo of the ringing signal is achieved under the control of the common controller, it can be easily changed in relation to the call. This facilitates the type of service whereby the kind of call (for example, a call from the extension of the private branch exchange, or a call from the central office line) is indicated by the ringing signal itself.

Also, it is easy to send the ring back tone back to the calling telephone in synchronism with the ringing signal.

Figure 3:
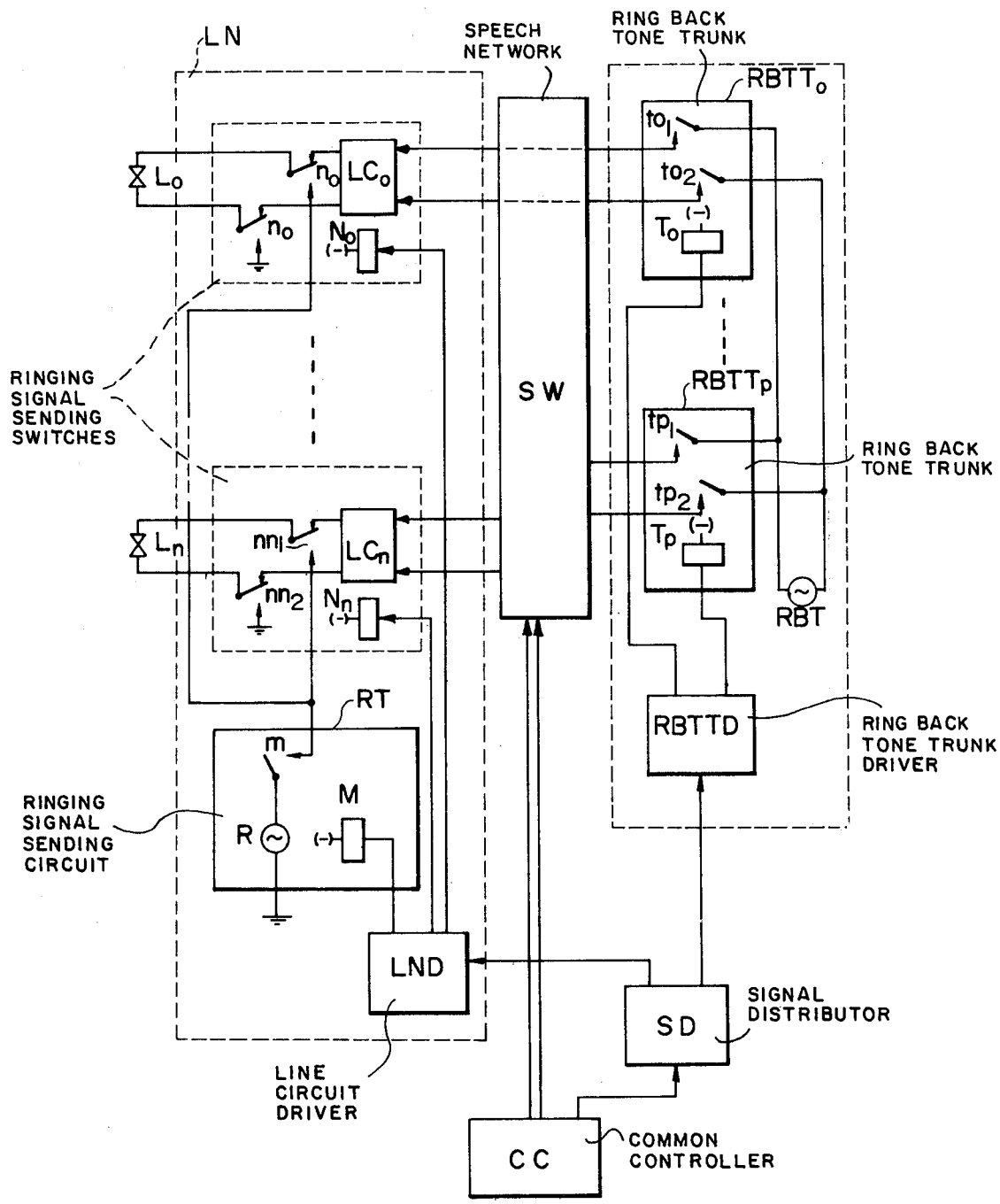
FIG. 3 is a connection diagram illustrating an embodiment of this invention.

FIG. 3 is a connection diagram showing an embodiment of this invention, in which parts corresponding to those in FIG. 1 are identified by the same reference characters. In FIG. 3, reference character LND indicates a line circuit driver provided in a line circuit group LN; $RBTT_0$ to $RBTT_p$ designate ring back tone trunks; RBTTD identifies a ring back tone trunk driver provided for the ring back tone trunks $RBTT_0$ to $RBTT_p$; and SD denotes a signal distributor.

Figure 4:
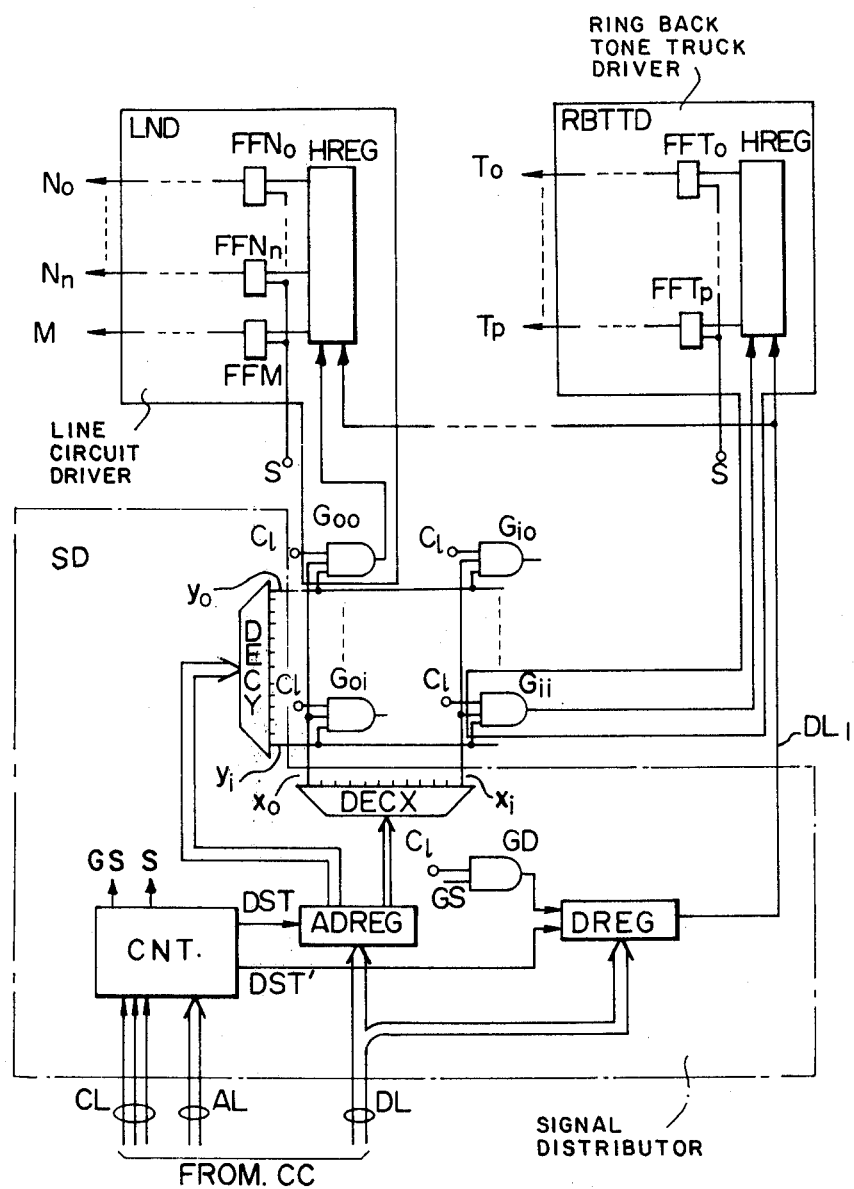
FIG. 4 is a detailed connection diagram of a signal distributor used in the embodiment of FIG. 3.

FIG. 4 shows in detail the interconnection of the signal distributor SD, the line circuit driver LND and the ring back tone trunk driver RBTTD, and the conditions of signal transmission and reception between the above circuits and associated circuits in the embodiment of FIG. 3.

Next, the operation of the embodiment of FIG. 3 will be described. Also in this case, let it be assumed that the telephone $L_0$ originates a call to terminate at the telephone $L_n$, as is the case with FIG. 1. The telephone $L_0$ is connected to the telephone $L_n$ through the speech network SW under the control of the common controller CC. At first, when the called telephone $L_n$ is connected, the calling telephone $L_0$ is not connected to the called telephone $L_n$, but connected to, for instance, the input end of the ring back tone trunk $RBTT_0$ through the speech network SW, and under the control of the common controller CC, a ringing signal is sent to the called telephone $L_n$ and a ring back tone is sent to the calling telephone $L_0$.

In this case, control information for controlling the sending of the ringing signal and the ring back tone is applied from the common controller CC to the signal distributor SD, and further sent to the line circuit driver LND and the ring back tone trunk driver RBTTD to control the drive of the line circuits, the ringing signal sending circuit RT and the ring back tone trunks $RBTT_0$ to $RBTT_p$.

With reference to FIG. 4, a description will be given of the operations of the signal distributor SD, the line circuit driver LND and the ring back tone trunk driver RBTTD.

When signal distributor designating information, distribution designating information and driver identifying information and data information to be distributed to the driver arrive at the signal distributor SD from the common controller CC through an address line AL, a control line CL, and a data line DL, respectively, a control circuit CNT checks the signal distributor designating information applied from the address line AL. If the abovesaid information is to designate the signal distributor SD itself, the control circuit CNT applies a data set timing signal DST to an address register ADREG to store therein the driver (LND, RBTTD, etc.) identifying information, i.e. address information, included in the information transferred in parallel from the data line DL. The address information is divided into two, and decoded by an X-decoder DECX and a Y-decoder DECY, respectively. For instance, if outputs "1" appear in output lines $x_0$ and $y_0$ of the both decoders DECX and DECY, two inputs to an AND gate $G_{00}$ at the intersection of the output lines $x_0$ and $y_0$ become "1" to drive the output of the AND gate $G_{00}$ to "1" at every arrival of a clock pulse Cl. This output reaches a holding register HREG of the line circuit driver LND. That is, by means of the address information stored in address register ADREG as described above, one of the abovesaid drivers (LND and RBTTD) is identified and addressed.

On the other hand, the data information transferred in parallel from the data line DL is stored in a data register DREG which is started by a data set timing signal DST similarly applied thereto from the control circuit CNT.

Next, the data stored in the data register DREG is transferred to the driver (LND or RBTTD) addressed as described above. This transfer takes place in the following manner:

From the control circuit CNT, a gate signal GS is applied to an AND gate GD to open it to apply thereto the clock pulse Cl. In synchronism with the clock pulse Cl, the data stored in the data register DREG is transferred in series through a line $DL_1$ to the holding register HREG of the line circuit driver LND designated by the gate $G_{00}$. Upon completion of this data transfer, flip-flops $FFN_0$ to $FFN_n$ and FFM are set to the same state as that of the cell corresponding to the holding register HREG by a set pulse applied to a set terminal S sent from control circuit CNT. The outputs from the flip-flops are amplified by proper means (not shown), and applied to the relays $N_0$ to $N_n$ of the line circuits and the relay M of the ringing signal sending circuit RT respectively, controlling the operations of the relays in accordance with the data transferred to the holding register HREG as described above. As a result of this, sending of the ringing signal is controlled, as already explained.

In the above, if the ring back tone trunk driver RBTTD is addressed, outputs "1" appear in output lines $x_i$ and $y_i$ of the X-decoder DECX and the Y-decoder DECY to select a gate $G_{ij}$ connected to the intersection of the output lines $x_i$ and $y_i$, thus designating the abovesaid ring back tone trunk driver RBTTD. Since the subsequent operations are the same as those described above, no description will be repeated. When the ring back tone trunk driver RBTTD has been designated as set forth above, relays $T_0$ to $T_p$ of the ring back tone trunks $RBTT_0$ to $RBTT_p$ are controlled in accordance with the data transferred from the common controller CC. Since the abovesaid data is transferred from the common controller CC at predetermined timing, the relays $N_0$ to $N_n$, M and $T_0$ to $T_p$ are controlled at the abovementioned timing.

In the foregoing, it is needless to say that the data register DREG and the holding register HREG are constructed in the form of shift registers.

In the above embodiment, since the flip-flops for controlling the line circuit, the ringing signal sending circuit and the ring back tone trunk are not constructed in a matrix form, but are distributed respectively correspondingly to the telephone circuits, the flip-flops can be used efficiently and more flip-flops can be easily added, if necessary.

Further, since the data is transferred in series, the cable diameter is small and the cost of the system can be reduced.

The foregoing embodiment should be construed as being illustrative of this invention and should not be interpreted as limiting the invention specifically thereto.

In the above embodiment, in order that the drivers (LND and RBTTD) may receive data in series and convert it into a parallel form, the flip-flops $FFN_0$ to $FFN_n$ and FFM are used, each corresponding to each cell of the holding register HREG, but the data is sequentially shifted and sent in series to the holding register HREG under the control of the clock pulse Cl. In the absence of such flip-flops, as each bit of the data sequentially passes the other bit positions (cells) in the holding register HREG, there is the possibility that the relay ($N_0$ to $N_n$, M and $T_0$ to $T_p$) to be controlled could commit an erroneous operation. However, since the operational speed of this kind of relay is very slow as compared with the operational speed of the holding register HREG formed with electronic parts, it is possible to complete the data transfer within a sufficiently shorter time than the time of operation of the abovesaid relay by sufficiently increasing the speed of the clock pulse Cl in the data transfer to the holding register HREG. This eliminates the likelihood of the relay performing a faulty operation, so that the flip-flops $FFN_0$ to $FFN_n$ and FFM for the serial-parallel conversion can be left out.

Moreover, in FIGS. 1 and 3, the ring back tone source RBT need not always be such means as generates directly an audible signal as already referred to. That is, in the case where the speech network SW is of the time-division system, it is possible to employ a ring back tone source which generates a properly modulated audible signal by PAM, PCM delta method or any other suitable modulation. Further, the electromagnetic relays $T_0$, $T_1$ and $T_2$ to $T_p$ for controlling sending of the ring back tone may be replaced with circuits which conform to the type of the speech network SW, such as logical gates. Where the logical gates are employed, they can be controlled directly by the outputs from the holding register HREG or the flip-flops $FFT_0$ to $FFT_p$ supplied with the outputs from the holding register HREG in the ring back tone trunk driver RBTTD shown in FIG. 4. Consequently amplifiers for actuating the electromagnetic relays become unnecessary, so that the circuit construction is much simplified.

Numerous changes may be made in the above described circuits and different embodiments of the invention may be made without departing from the spirit thereof; therefore, it is intended that all matter contained in the foregoing description and in the accompanying drawings shall be interpreted as illustrative and not in a limiting sense.

What is claimed is:

1. A signal sending control system for controlling the sending of signals via a plurality of subscriber lines, each subscriber line having a corresponding telephone connected thereto, said system comprising:

a ringing signal sending circuit including a signal source for generating a continuous ringing signal, and interrupting means provided in common to said plurality of subscriber lines, for controlling transmission of the ringing signal over said each subscriber line;

switching means, one for each subscriber line, for selectively and switchably connecting said each subscriber line to a speech network of an exchange and to the ringing signal sending circuit;

a common controller for providing control information as to transmission and cessation of the ringing signal, and required timing thereof; and control means for individually controlling the switching means of each subscriber line in accordance with said control information to transmit the ringing signal at said required timing and for controlling the interrupting means of the ringing signal sending circuit to cease the transmission of the ringing signal at the time of switching of any one of the switching means.

2. The signal sending control system according to claim 1, further including:

at least one ring back tone trunk;

a ring back tone source provided in common to all of said at least one ring back tone trunk for generating a continuous ring back tone; and ring back tone sending control means for sending the ring back tone at said required timing in accordance with said control information from the common controller.

3. The signal sending control system according to claim 2, further including means for periodically controlling the interrupting means of the ringing signal sending circuit and the ring back tone sending control means of the at least one ring back tone trunks in accordance with control information from the common controller.

4. The signal sending control system according to claim 1, further including signal holding means, one for each corresponding subscriber line and the ringing signal sending circuit, for holding said control information from said common controller.

5. The signal sending control system according to claim 1, further including a signal distributor means responsive to control information supplied thereto in parallel from the common controller for transferring the control information in series as an output, and signal holding means for holding said control information transferred as said output by said signal distributor means.

6. In a telephone system comprising a plurality of subscriber lines and a plurality of switches, one for each respective subscriber line, for enabling at least one calling subscriber line to ring corresponding at least one called subscriber line, said switches having at least a ringing position and a speech position;

means for issuing control signals respectively identifying said at least one calling subscriber line and said at least one called subscriber line, control means responsive to said control signals for actuating said switch of said at least one called subscriber line to the ringing position, and ringing signal sending means for commencing transmission of a ringing signal to said at least one called subscriber line a small first predetermined time after actuation of said switch of said at least one called subscriber line to the ringing position, and for stopping transmission of said ringing signal to said at least one called subscriber line a second predetermined time, larger than said first predetermined time, after commencement of said transmission of said ringing signal to said at least one called subscriber line, said control means actuating said switch of said at least one called subscriber line to said speech position a small third predetermined time after said stopping of said transmission of said ringing signal to said at least one called subscriber line, said system including interrupting means responsive, during said transmission of said ringing signal, to actuation of any one of said switches to one of said ringing position and said speech position, for interrupting said transmission of said ringing signal to said at least one called subscriber line for a small predetermined time interval.

7. In the telephone system of claim 6, wherein said ringing signal sending means comprises a ring generator for generating said ringing signal, a relay, and a control circuit for actuating said relay to alternate positions thereof so as to selectively pass and interrupt said generated ringing signal.

8. In the telephone system of claim 7, wherein said switches have a speech position defining a speech network, said control means being additionally responsive to said control signals for actuating said switch of said at least one calling subscriber line to said speech position, said system further including ring back tone generator means for generating a ring back tone, and means connecting said speech position of said switch of each of said at least one calling subscriber line to said ring back tone generator means for passing said generated ring back tone to said each of said at least one calling subscriber line through said speech network.

9. In the telephone system of claim 8, said system further including means for synchronizing the generation of said ringing signal and said ring back tone.

10. In the telephone system of claim 6, wherein said switches have a speech position defining a speech network, said control means being additionally responsive to said control signals for actuating said switch of said at least one calling subscriber line to said speech position, said system further including ring back tone generator means for generating a ring back tone, and means connecting said speech position of said switch of each of said at least one calling subscriber line to said ring back tone generator means for passing said generated ring back tone to said each of said at least one calling subscriber line through said speech network.

11. In the telephone system of claim 6, wherein said control signals identify the type of call being made by said at least one calling subscriber line, said ringing signal sending means comprising a ring generator for generating said ringing signal, and means responsive to said control signals for selectively passing and interrupting said ringing signal in accordance with a predetermined timing pattern corresponding to said type of call being made by said at least one calling subscriber line.

12. In a telephone system comprising a plurality of subscriber lines, each subscriber line being selectively actuable to constitute one of a calling subscriber line and a called subscriber line, said called subscriber line receiving a ringing signal from a ringing signal driver circuit and said calling subscriber line receiving a ring back tone from a ring back tone driver circuit;

controlling means for issuing control signals including address information for indicating a selected one of said ringing signal driver circuit and said ring back tone driver circuit, and data information indicating required control of each of said subscriber lines relative to said selected one of said ringing signal driver circuit and said ring back tone driver circuit, said data information comprising a multi-bit word wherein each bit of said multi-bit word corresponds to a subscriber line to be controlled; and means responsive to said address information for controlling said selected one of said ringing signal driver circuit and said ring back tone driver circuit for each subscriber line in accordance with said multi-bit word of said data information.

13. In the telephone system of claim 12, wherein said controlling means comprises a signal distributor circuit, said signal distributor circuit being responsive to said address information for selectively enabling said selected one of said ringing signal driver circuit and said ring back tone driver circuit, said selected one of said ringing signal driver circuit and said ring back tone driver circuit being responsive to said data information for producing said ringing signal tone and said ring back tone, respectively, for each of said plurality of subscriber lines.

14. In the telephone system of claim 13, wherein said signal distributor circuit comprises an address register for receiving said address information and a decoder circuit for decoding said address information in said address register so as to provide a decoder output enabling said selected one of said ringing signal driver circuit and said ring back tone driver circuit.

15. In the telephone system of claim 13, wherein said signal distributor circuit comprises a parallel-to-serial converting data register for receiving and parallel-to-serial converting said data information, said data information being serially provided to said selected one of said ringing signal driver circuit and said ring back tone driver circuit.

16. In the telephone system of claim 12, wherein said controlling means comprises a parallel-to-serial converting data register for receiving and parallel-to-serial converting said data information, said data information being serially provided to said selected one of said ringing signal driver circuit and said ring back tone driver circuit.

17. In the telephone system of claim 16 wherein said controlling means comprises a signal distributor circuit, a ringing signal driver circuit, and a ring back tone driver circuit, said signal distributor circuit comprising a data register for receiving and holding said data information, and clocking means for providing a clocking signal, said signal distributor circuit being responsive to said clocking signal for providing said data information to said selected one of said ringing signal driver circuit and said ring back tone driver circuit, said control means issuing a control signal of given frequency for controlling said selected one of said ringing signal driver circuit and said ring back tone driver circuit in accordance with said data information provided by said data register, said clocking signal having a frequency sufficiently higher than said given frequency of said control signal of given frequency so as to enable completion of said transfer of said data information from said data register prior to completion of said control of said selected one of said ringing signal driver circuit and said ring back tone driver circuit by said controlling means.

* * * * *

UNITED STATES PATENT AND TRADEMARK OFFICE
CERTIFICATE OF CORRECTION

PATENT NO. : 4,113,990

DATED : September 12, 1978

INVENTOR(S) : Shoji Nojiri et al

It is certified that error appears in the above-identified patent and that said Letters Patent are hereby corrected as shown below:

```
Column 2, line 30, after "upon" insert --the--.
Column 2, line 30, delete "the".
Column 6, line 11, "Cl" should be --Cℓ--.
Column 6, line 28, "Cl" should be --Cℓ--.
Column 6, line 29, "Cl" should be --Cℓ--.
Column 7, line 15, "Cl" should be --Cℓ--.
Column 7, line 27, "Cl" should be --Cℓ--.
```

UNITED STATES PATENT AND TRADEMARK OFFICE
CERTIFICATE OF CORRECTION

PATENT NO. : 4,113,990
DATED : September 12, 1978
INVENTOR(S) : Shoji Nojiri et al It is certified that error appears in the above-identified patent and that said Letters Patent are hereby corrected as shown below:

Figure 4, "RING BACK TONE TRUCK DRIVER" should be --RING BACK TONE TRUNK DRIVER--.

Signed and Sealed this

Twenty-fourth Day of April 1979

[SEAL]

Attest:

RUTH C. MASON
Attesting Officer

DONALD W. BANNER
Commissioner of Patents and Trademarks